United States Patent
Porras et al.

(10) Patent No.: US 10,486,495 B2
(45) Date of Patent: Nov. 26, 2019

(54) METHOD AND SYSTEM TO MANAGE VEHICLE THERMAL CONDITIONS

(71) Applicant: Ford Global Technologies, LLC, Dearborn, MI (US)

(72) Inventors: Angel Fernando Porras, Dearborn, MI (US); Timothy Noah Blatchley, Dearborn, MI (US); Brett Allen Dunn, Plymouth, MI (US); Anthony David Tsakiris, Beverly Hills, MI (US); James George Gebbie, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/625,438

(22) Filed: Jun. 16, 2017

(65) Prior Publication Data
US 2018/0361825 A1    Dec. 20, 2018

(51) Int. Cl.
*B60H 1/00* (2006.01)
*B60H 1/03* (2006.01)

(52) U.S. Cl.
CPC ..... *B60H 1/00914* (2013.01); *B60H 1/00385* (2013.01); *B60H 1/034* (2013.01); *B60H 2001/00928* (2013.01); *B60H 2001/00949* (2013.01); *B60H 2001/00957* (2013.01)

(58) Field of Classification Search
CPC .............. B60H 1/004; B60H 1/00914; B60H 1/00385; B60H 1/034; B60H 2001/00928; B60H 2001/00949; B60H 2001/00957; B60H 1/03; G06F 1/3203

USPC .......................................................... 165/202
See application file for complete search history.

(56) References Cited

U.S. PATENT DOCUMENTS

| | | | |
|---|---|---|---|
| 5,275,012 A * | 1/1994 | Dage | B60H 1/00392 219/202 |
| 2010/0107112 A1* | 4/2010 | Jennings | G06F 1/3203 715/777 |
| 2013/0333395 A1* | 12/2013 | Morita | B60H 1/004 62/3.61 |
| 2014/0116673 A1* | 5/2014 | Kang | B60H 1/004 165/222 |
| 2015/0000327 A1 | 1/2015 | Kakehashi et al. | |
| 2015/0183296 A1* | 7/2015 | Ragazzi | B60H 1/03 219/205 |
| 2015/0210141 A1 | 7/2015 | Ragazzi | |

(Continued)

*Primary Examiner* — Davis D Hwu
(74) *Attorney, Agent, or Firm* — David B. Kelley; Brooks Kushman P.C.

(57) ABSTRACT

A vehicle climate control system for an electrified vehicle including a thermal circuit and a controller is provided. The thermal circuit includes a heat pump and a positive temperature coefficient (PTC) heater. The controller is programmed to direct operation of the heat pump and the PTC heater responsive to receipt of a request for simultaneous cooling and heating based on a heat source mode table and detection of a system configuration in which flow is permitted through one of a fixed orifice expansion device (FOT), a thermal expansion valve (TXV), and an electronic expansion valve (EXV). The heat source mode table may call for the heat pump to operate in a cool mode and the PTC heater to operate in a heat mode when heater core coolant is identified as warm and ambient temperature is above a predetermined threshold.

18 Claims, 4 Drawing Sheets

(56) References Cited

U.S. PATENT DOCUMENTS

2016/0033175 A1  2/2016  Ragazzi et al.
2016/0129757 A1  5/2016  Kodera et al.
2016/0159204 A1  6/2016  Katoh et al.

* cited by examiner

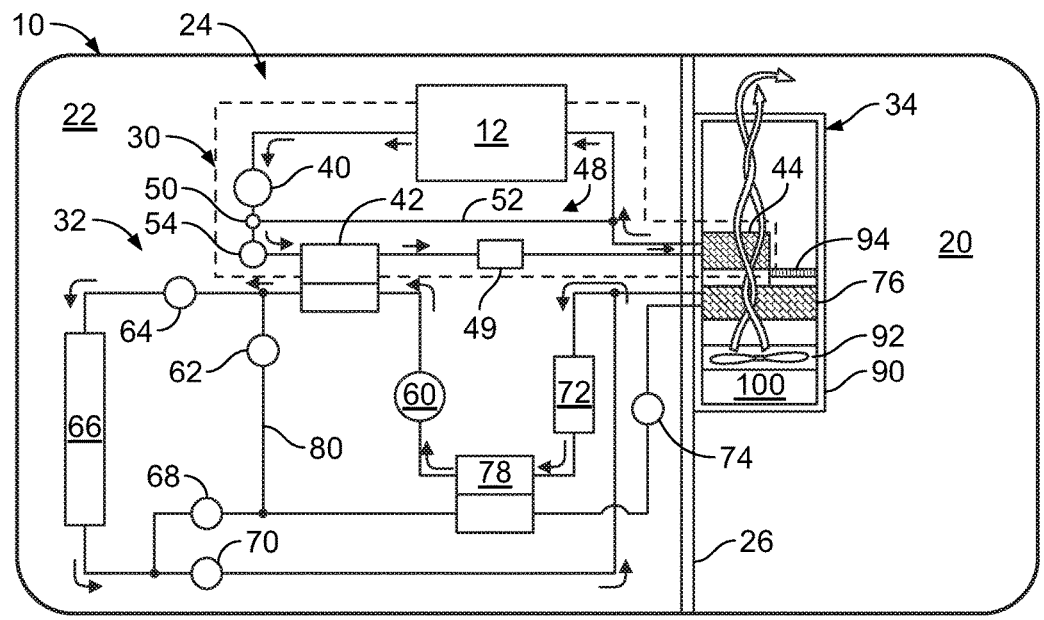
FIG. 1
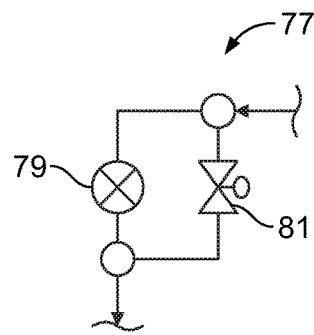
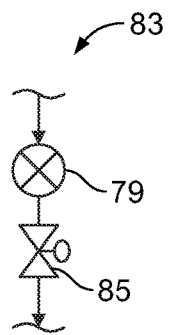
FIG. 2A  FIG. 2B

| Hardware Component | Operating Modes | | | | |
|---|---|---|---|---|---|
| | Cool | Heat | Series Dehumid-ification | Parallel Dehumid-ification | De-ice |
| Compressor | on | on | on | on | on |
| Auxiliary coolant pump | off | on | on | on | off* |
| Expansion valve for cooling | throttled | closed | throttled | throttled | closed |
| Expansion valve for heating | fully open | throttled | throttled | throttled | partially throttled or open |
| Electronic bypass valve | closed | open | closed | open | open |
| Electronic bypass valve | closed | closed | closed | open | closed |

*The Auxiliary Coolant Pump may be 'ON' in a scenario in which heat is being extracted from refrigerant.

FIG. 3

METHOD AND SYSTEM TO MANAGE VEHICLE THERMAL CONDITIONS

TECHNICAL FIELD

The present disclosure relates to a heat pump system for assisting in managing thermal conditions of a vehicle.

BACKGROUND

Electrified vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage battery, to act as a propulsion source for the vehicle. The high voltage battery may include components and systems to assist in managing vehicle performance and operations. Vehicle cabin climate control systems may operate with engine thermal management systems to provide efficient distribution of heat via refrigerants and coolant flowing throughout a heat pump system. A control system may direct operation of various components of the climate control system and thermal management system based on input received from sensors monitoring vehicle and ambient conditions.

SUMMARY

A vehicle climate control system for an electrified vehicle includes a thermal circuit and a controller. The thermal circuit includes a heat pump and a positive temperature coefficient (PTC) heater. The controller is programmed to direct operation of the heat pump and the PTC heater responsive to receipt of a request for simultaneous cooling and heating based on a heat source mode table and detection of a system configuration in which flow is permitted through one of a fixed orifice expansion device (FOT), a thermal expansion valve (TXV), and an electronic expansion valve (EXV). The heat source mode table may call for the heat pump to operate in a cool mode and the PTC heater to operate in a heat mode when heater core coolant is identified as warm and ambient temperature is above a predetermined threshold. The heat source mode table may call for the heat pump to operate in a cool mode and the PTC heater to be inactive when heater core coolant is identified as hot and ambient temperature is above a predetermined threshold. The heat source mode table may call for the PTC heater to output heat when heater core coolant is identified as warm and ambient temperature is less than or equal to a predetermined threshold. Activation of the simultaneous cooling and heating operation may be further based on a climate heating request, a climate cooling request, ambient temperature, and a relationship between heater core coolant temperature and a target heater core coolant temperature. Heater core coolant temperature may be measured by a sensor and input into the heat source mode table as one of cold, warm, and hot based on calibratable constants. The operating status of the FOT, TXV, or EXV may be active during a cooling mode. The operating status of the FOT, TXV, or EXV may be not active during a heating mode. The system may include another one of a FOT, TXV, or EXV. During a dehumidification mode, the operating status of the FOT, TXV, or EXV may be active for a cooling expansion device and the operating status of the another one of the FOT, TXV, or EXV may be active for a heating expansion device. Operation of the heat pump and the PTC heater may be based on predetermined temperature thresholds and measured ambient temperature.

A vehicle climate control system for an electrified vehicle includes a thermal circuit and a controller. The thermal circuit includes a heat pump, a secondary heat source, and one of a FOT, a TXV, and an EXV. The controller is programmed to activate the secondary heat source based on an operating status of the FOT, TXV, or EXV and a mode command table. The secondary heat source may be activated and the FOT, TXV, or EXV may be directed to operate as active during a heating mode. The secondary heat source may be a positive temperature coefficient heater. The mode command table may call for the heat pump to operate in a dehumidify mode and the positive temperature coefficient heater to be inactive when a temperature of heater core coolant is identified as warm and ambient temperature is above a predetermined threshold. The mode command table may call for the heat pump to operate in a cool mode and the positive temperature coefficient heater to be inactive when heater core coolant is identified as hot and ambient temperature is above a predetermined threshold. The mode command table may call for the heat pump to operate in a dehumidify mode and the positive temperature coefficient heater to be inactive when heater core coolant is identified as cold and ambient temperature is above a predetermined threshold. The secondary heat source may be an engine.

A method to operate a vehicle climate control system includes outputting via a controller a command to activate a secondary heat source based on ambient temperature and a predetermined calibratable constant temperature in response to receiving a cool mode request and a heat mode request simultaneously. The method may further include outputting via a controller a heat pump operating command to adjust a climate of a vehicle based on the ambient temperature, a heater core coolant temperature, a target heater core coolant temperature, and a climate control request in response to detection of a flow change for one of a fixed orifice expansion device, a thermal expansion valve, and an electronic expansion valve. The secondary heat source may be one of a positive temperature coefficient heater and an engine.

BRIEF DESCRIPTION OF THE DRAWINGS

FIG. 1 is a schematic representation of an example of a vehicle.

FIG. 2A is a schematic representation of an example of a valve expansion device.

FIG. 2B is a schematic representation of another example of a valve expansion device.

FIG. 3 is a table showing examples of component operation status during various operating modes of an example of a vapor compression heat pump (VCHP) subsystem for the vehicle of FIG. 1.

DETAILED DESCRIPTION

Figure 4:
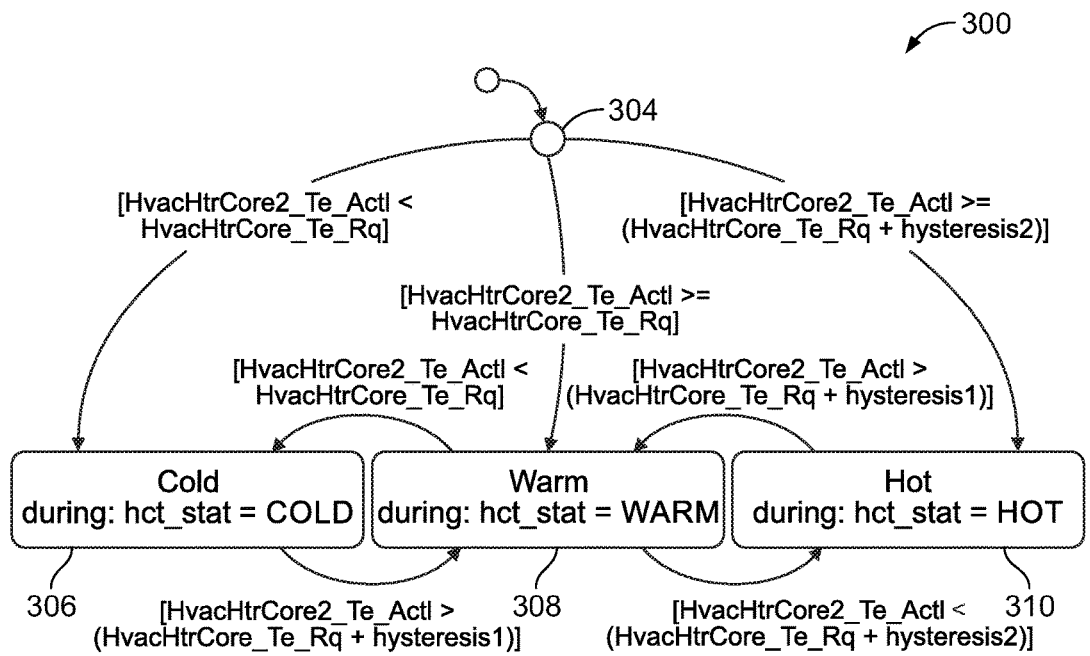
FIG. 4 is a state diagram illustrating an example of a control strategy of a VCHP subsystem for the vehicle of FIG. 1.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Under certain conditions, electrified vehicles, such as BEVs and PHEVs, may need an alternative source of heat to replace or augment an amount of heat rejected by a traditional internal combustion engine to meet vehicle cabin heating targets. Vapor compression heat pump (VCHP) technology may provide acceptable vehicle cabin heating by extracting energy from the vehicle's ambient environment.

Referring to FIG. 1, a schematic representation of a vehicle 10 is shown. The vehicle 10 may be a motor vehicle, such as a car or truck. The vehicle 10 may have any suitable drivetrain and may include one or more power sources 12 that may be used to propel the vehicle 10 and/or power vehicle components. In FIG. 1, the vehicle 10 is shown with a single power source 12 that may be configured as an internal combustion engine that may be adapted to combust any suitable type of fuel, such as gasoline, diesel fuel, or hydrogen. As another option, vehicle 10 may be configured as a hybrid vehicle that may have a plurality of power sources, such as a non-electrical power source like an engine and an electrical power source.

The vehicle 10 may include a passenger compartment 20, an engine compartment 22, and a climate control system 24. The passenger compartment 20 may be disposed inside the vehicle 10 and may receive one or more occupants. A portion of the climate control system 24 may be disposed in the passenger compartment 20. The engine compartment 22 may be disposed proximate the passenger compartment 20. One or more power sources 12 as well as a portion of the climate control system 24 may be disposed in the engine compartment 22. The engine compartment 22 may be separated from the passenger compartment 20 by a bulkhead 26. The climate control system 24 may circulate air and/or control or modify the temperature of air that is circulated in the passenger compartment 20. The climate control system 24 may include a coolant subsystem 30, a heat pump subsystem 32, and a ventilation subsystem 34.

The coolant subsystem 30, which may also be referred to as a coolant loop, may circulate a fluid, such as coolant, to cool the power source 12. For example, waste heat that is generated by the power source 12 when the power source is running or operational may be transferred to the coolant and then circulated to one or more heat exchangers to transfer thermal energy from the coolant. In at least one embodiment, the coolant subsystem 30 may include a coolant pump 40, an intermediate heat exchanger 42, a heater core 44, and a bypass loop 48 that may be fluidly interconnected by conduits such as tubes, hoses, pipes, or the like. The coolant subsystem 30 may include a radiator (not shown) that may be disposed in the engine compartment 22 for transferring thermal energy to the ambient air surrounding the vehicle 10. The coolant subsystem 30 may include a secondary heat source 49. The secondary heat source 49 may be, for example, a positive temperature coefficient (PTC) heater. In an embodiment including an engine, the engine may also operate as a secondary heat source.

The coolant pump 40 may circulate coolant through the coolant subsystem 30. The coolant pump 40 may be powered by an electrical or non-electrical power source. For example, the coolant pump 40 may be operatively coupled to a power source 12 configured as an internal combustion engine via a belt or may be driven by an electrically powered motor. The coolant pump 40 may receive coolant from the power source 12 and circulate the coolant in a closed loop. For instance, when the climate control system 24 is in a heating mode, coolant may be routed from the coolant pump 40 to the intermediate heat exchanger 42 and then to the heater core 44 before returning to the power source 12 as represented by the arrowed lines.

The intermediate heat exchanger 42 may facilitate the transfer of thermal energy between the coolant subsystem 30 and the heat pump subsystem 32. The intermediate heat exchanger 42 may be part of the coolant subsystem 30 and the heat pump subsystem 32. The intermediate heat exchanger 42 may have any suitable configuration. For instance, the intermediate heat exchanger 42 may have a plate-fin, tube-fin, or tube-and-shell configuration that may facilitate the transfer of thermal energy without mixing the heat transfer fluids in the coolant subsystem 30 and the heat pump subsystem 32. Heat may be transferred from the heat pump subsystem 32 to the coolant via the intermediate heat exchanger 42 when the climate control system 24 is in a heating mode as will be discussed in more detail below.

The heater core 44 may transfer thermal energy from the coolant to air in the passenger compartment 20. The heater core 44 may be disposed in the passenger compartment 20 in the ventilation subsystem 34 and may have any suitable configuration. For example, the heater core 44 may have a plate-fin or tube-fin construction in one or more embodiments.

The coolant subsystem 30 may optionally include the secondary heat source 49 to heat the coolant. In at least one embodiment, the secondary heat source 49 may be an electrical coolant heater, such as a high voltage coolant heater or low voltage coolant heater that may be disposed upstream of the heater core 44 and that may use electrical energy to heat the coolant. An electrical coolant heater may receive power from an electrical power source on the vehicle 10 and/or an electrical power source remote from the vehicle 10, such as via an electrical outlet. Alternatively or in addition, the secondary heat source 49 may be a non-electrical coolant heater, such as a fuel-operated or fuel-powered heater.

The bypass loop 48 may route coolant such that the coolant is not heated by the power source 12 or engine. A bypass loop control valve 50 may control the flow of coolant through the bypass loop 48. More specifically, the bypass loop control valve 50 may permit coolant to flow through a bypass line 52 and inhibit the flow of coolant from the power source 12 to the intermediate heat exchanger 42 when in a first position. In such a position, a second coolant pump 54 may circulate coolant through the bypass loop 48 from the intermediate heat exchanger 42 to the heater core 44 to the bypass line 52 and back to the second coolant pump 54. As such, the coolant in the coolant subsystem 30 may be heated independently by the heat pump subsystem 32 via the intermediate heat exchanger 42 in some operation modes. The second coolant pump 54 may also be referred to as an auxiliary coolant pump. The bypass loop control valve 50 may also inhibit the flow of coolant through the bypass line 52 when in a second position. The second coolant pump 54 may or may not circulate coolant when coolant does not flow through the bypass line 52.

The heat pump subsystem 32 may transfer thermal energy to or from the passenger compartment 20 and to or from the coolant subsystem 30. In at least one embodiment, the heat pump subsystem 32 may be configured as a VCHP subsystem in which a fluid is circulated through the heat pump subsystem 32 to transfer thermal energy to or from the passenger compartment 20. In this example, the VCHP subsystem may operate with an expansion device. An expansion device may be operated in response to received control signals to, for example, operate a motor to selectively transition an operating status of an electronic expansion valve (EXV) between open and closed positions of a valve port. The heat pump subsystem 32 may operate in various modes, including, but not limited to a cooling mode, a heating mode, a dehumidification mode, and a de-icing mode.

In the cooling mode, the heat pump subsystem 32 may circulate a heat transfer fluid, which may be called a refrigerant, to transfer thermal energy from inside the passenger compartment 20 to outside the passenger compartment 20. In the heating mode, the heat pump subsystem 32 may transfer thermal energy from the refrigerant to the coolant via the intermediate heat exchanger 42 without circulating the refrigerant through a heat exchanger in the passenger compartment 20 as will be discussed in more detail below. For brevity, an abbreviated discussion of the heat pump subsystem 32 is provided below that focuses on a vapor compression cycle that may be employed in the heating mode. In such a configuration, the heat pump subsystem 32 may include a pump 60, a first control valve 62, a first expansion device 64, an exterior heat exchanger 66, a second control valve 68, a third control valve 70, an accumulator 72, a second expansion device 74, an interior heat exchanger 76, and an optional internal heat exchanger 78. Components of the heat pump subsystem 32 may be fluidly connected in a closed loop via one or more conduits, such as a tube, hose or the like. In FIG. 1, the refrigerant circulation path when in the cooling mode is represented by the arrowed lines.

Each of the first expansion device 64 and the second expansion device 74 may be a cooling expansion device or a heating expansion device. The first expansion device 64 and the second expansion device 74 may be an EXV. Another example of a VCHP subsystem may operate with an assembly including a fixed orifice expansion device (FOT) or thermal expansion valves (TXV) instead of the EXVs. FIG. 2A shows an example of an assembly 77 in which the first expansion device 64 includes an FOT or TXV 79 and a bypass shutoff valve 81. FIG. 2B shows an example of an assembly 83 in which the second expansion device 74 includes the FOT or TXV 79 and a shutoff valve 85. Generally, an EXV may be replaced with an FOT or TXV and a bypass shutoff valve or a shutoff valve in a thermal circuit.

Referring again to FIG. 1, the pump 60, which may also be called a compressor, may pressurize and circulate the refrigerant through the heat pump subsystem 32. The pump 60 may be powered by an electrical or non-electrical power source. For example, the pump 60 may be operatively coupled to a power source 12 configured as an internal combustion engine via a belt or may be driven by an electrically powered motor. In a heating mode, the pump 60 may provide high pressure refrigerant to the intermediate heat exchanger 42, which in turn may transfer heat from the high-pressure refrigerant to coolant passing through the intermediate heat exchanger 42 to heat the coolant.

The first control valve 62 may be disposed along a bypass path 80 that may be disposed between the intermediate heat exchanger 42 and the first expansion device 64. The bypass path 80 may permit some refrigerant to bypass the first expansion device 64 and the exterior heat exchanger 66 and flow to the internal heat exchanger 78 (if provided), the second expansion device 74, and the interior heat exchanger 76 when the first control valve 62 is open. The first control valve 62 may be closed to inhibit the flow of refrigerant through the bypass path 80 to the interior heat exchanger 76 when in heating mode.

The first expansion device 64 may be disposed between and may be fluidly connected to the intermediate heat exchanger 42 and the exterior heat exchanger 66. The first expansion device 64 may be provided to change the pressure of the refrigerant. The first expansion device 64 may reduce the pressure of the refrigerant that passes through the first expansion device 64 from the intermediate heat exchanger 42 to the exterior heat exchanger 66. As such, high pressure refrigerant received from the intermediate heat exchanger 42 may exit the first expansion device 64 at a lower pressure and as a liquid and vapor mixture in the heating mode.

The exterior heat exchanger 66 may be disposed outside the passenger compartment 20. In a cooling mode or air conditioning context, the exterior heat exchanger 66 may function as a condenser and may transfer heat to the surrounding environment to condense the refrigerant from a vapor to liquid. In a heating mode, the exterior heat exchanger 66 may function as an evaporator and may transfer heat from the surrounding environment to the refrigerant, thereby causing the refrigerant to vaporize.

The second control valve 68 may be disposed between the exterior heat exchanger 66 and the bypass path 80. The second control valve 68 may be configured as a check valve and may inhibit the flow of refrigerant from the bypass path 80 to the exterior heat exchanger 66. As such, refrigerant exiting the exterior heat exchanger 66 when the climate control system 24 is in the heating mode may be routed to the third control valve 70.

A third control valve 70 may be disposed between the exterior heat exchanger 66 and the accumulator 72. The third control valve 70 may help control the flow of refrigerant that exits the exterior heat exchanger 66. In the heating mode, the third control valve 70 may be open to permit refrigerant to flow from the exterior heat exchanger 66 to the accumulator 72. The third control valve 70 may be closed and the second expansion device 74 may be opened in other modes, such as a cooling mode.

The accumulator 72 may act as a reservoir for storing any residual liquid refrigerant so that vapor refrigerant rather than liquid refrigerant may be provided to the pump 60. The accumulator 72 may include a desiccant that absorbs small amounts of water moisture from the refrigerant.

The second expansion device 74 may be disposed between and may be fluidly connected to the exterior heat exchanger 66 and the interior heat exchanger 76. The second expansion device 74 may have a similar configuration as the first expansion device 64 and may be provided to change the pressure of the refrigerant similar to the first expansion device 64. In addition, the second expansion device 74 may be closed to inhibit the flow of refrigerant. More specifically, the second expansion device 74 may be closed to inhibit the flow of refrigerant from the exterior heat exchanger 66 to the interior heat exchanger 76 in the heating mode. As such, closing the second expansion device 74 may inhibit the flow of refrigerant through the second control valve 68 to the internal heat exchanger 78 (if provided), as well as through the interior heat exchanger 76.

The interior heat exchanger 76 may be fluidly connected to the second expansion device 74. The interior heat exchanger 76 may be disposed inside the passenger compartment 20. In a cooling mode or air conditioning context, the interior heat exchanger 76 may function as an evaporator and may receive heat from air in the passenger compartment 20 to vaporize the refrigerant. Refrigerant exiting the interior heat exchanger 76 may be routed to the accumulator 72. In the heating mode, refrigerant may not be routed to the interior heat exchanger 76 due to the closure of the second expansion device 74.

The internal heat exchanger 78, if provided, may transfer thermal energy between refrigerant flowing through different regions of the heat pump subsystem 32. The internal heat exchanger 78 may be disposed outside the passenger compartment 20. In a cooling mode or air conditioning context, heat may be transferred from refrigerant that is routed from the exterior heat exchanger 66 to the interior heat exchanger 76 to refrigerant that is routed from the accumulator 72 to the pump 60. In the heating mode, the internal heat exchanger 78 does not transfer thermal energy between such refrigerant flow paths since the second expansion device 74 is closed, thereby inhibiting the flow of refrigerant through a portion of the internal heat exchanger 78.

In a series dehumidification mode, the VCHP subsystem operates similarly to the heat mode except the third control valve 70 is closed and the second expansion device 74 permits coolant flow. In a parallel dehumidification mode, the VCHP subsystem operates similarly to the heat mode except the first control valve 62 is open and the second expansion device 74 permits coolant flow.

In a de-icing mode the VCHP subsystem operates similar to the cooling mode though the first expansion device 64 may or may not be throttled (if EXV) or bypassed (if FOT or TXV) with the second expansion device 74 closed.

The ventilation subsystem 34 may circulate air in the passenger compartment 20 of the vehicle 10. The ventilation subsystem 34 may have a housing 90, a blower 92, and a temperature door 94.

The housing 90 may receive components of the ventilation subsystem 34. In FIG. 1, the housing 90 is illustrated such that internal components are visible rather than hidden for clarity. In addition, airflow through the housing 90 and internal components is represented by the arrowed line. The housing 90 may be at least partially disposed in the passenger compartment 20. For example, the housing 90 or a portion thereof may be disposed under an instrument panel of the vehicle 10. The housing 90 may have an air intake portion 100 that may receive air from outside the vehicle 10 and/or air from inside the passenger compartment 20. For example, the air intake portion 100 may receive ambient air from outside the vehicle 10 via an intake passage, duct, or opening that may be located in any suitable location, such as proximate a cowl, wheel well, or other vehicle body panel. The air intake portion 100 may also receive air from inside the passenger compartment 20 and recirculate such air through the ventilation subsystem 34. One or more doors or louvers may be provided to permit or inhibit air recirculation.

The blower 92 may be disposed in the housing 90. The blower 92, which may also be called a blower fan, may be disposed near the air intake portion 100 and may be configured as a centrifugal fan that may circulate air through the ventilation subsystem 34.

The temperature door 94 may be disposed between the interior heat exchanger 76 and the heater core 44. In the embodiment shown, the temperature door 94 is disposed downstream of the interior heat exchanger 76 and upstream of the heater core 44. The temperature door 94 may block or permit airflow through the heater core 44 to help control the temperature of air in the passenger compartment 20. For instance, the temperature door 94 may permit airflow through the heater core 44 in the heating mode such that heat may be transferred from the coolant to air passing through the heater core 44. This heated air may then be provided to a plenum for distribution to ducts and vents or outlets located in the passenger compartment 20. The temperature door 94 may move between a plurality of positions to provide air having a desired temperature. In FIG. 1, the temperature door 94 is shown in a full heat position in which airflow is directed through the heater core 44.

The climate control system described above may help decrease the energy cost of heat provided by supplementing heat provided by an engine or vehicle power source. More specifically, the heat pump subsystem may generate and provide additional heat to coolant that may be used to heat the passenger compartment of a vehicle. Moreover, the climate control system may facilitate the commonization of climate control system components, such as heater core and/or ventilation system designs. As such, common heater core and/or ventilation systems may be provided with vehicles having different powertrain configurations, such as models having internal combustion engine and hybrid electric drivetrain options. Such commonization may allow associated tooling and manufacturing costs to be significantly reduced by providing common component designs across vehicle models that are offered with multiple powertrain configurations, and/or between vehicle platforms.

FIG. 3 is a table 250 showing an example of component status during various operating modes of a VCHP subsystem. In this example, the component statuses are shown for a VCHP subsystem including EXVs, however, it is to be understood that a table showing component statuses for a VCHP subsystem including FOTs or TXVs would be modified to operate in accordance with different expansion device assemblies such as those shown in FIGS. 2A and 2B as further described in relation to FIG. 5 below. Hardware components are identified in column 252 and operating modes are identified in an operating mode column 254. For example, the pump 60 is represented in row 256, the second coolant pump 54 is represented in row 258, the first expansion device 64 is represented in row 262, the second expansion device 74 is represented in row 260, the first control valve 62 is represented in row 266, and the second control valve 70 is represented in row 264. The operating mode column 254 is further divided into multiple columns including a cool mode column 270, a heat mode column 272, a series dehumidification mode column 274, a parallel dehumidification mode column 276, and a de-ice mode column 278. As mentioned above, the table 250 may be used to identify component status during operating modes of the VCHP subsystem. For example, during a heat mode, the pump 60 is on, the second coolant pump 54 is on, the first expansion device 64 is throttled, the second expansion device 74 is closed, the first control valve 62 is closed, and the second control valve 70 is open.

FIG. 4 shows an example of a control strategy for the VCHP subsystem, referred to generally as a control strategy 300 herein. Operation 304 represents a decision node in the control strategy 300. In operation 304, a controller examines actual heater core temperatures in comparison to requested heater core temperatures to identify whether to transition to operation 306, operation 308, or operation 310. Operation 306, operation 308, and operation 310 relate to heater core temperature conditions and a relationship between a requested and actual heater core temperature. The system may remain in operation 306, operation 308, or operation 310 for a predetermined amount of time, indefinitely, or until a predefined condition occurs. For example, if an actual heater core temperature is less than a heater core temperature request, the heater core operates in a cold mode in operation 306. If an actual heater core temperature is greater than a heater core temperature request, the heater core operates in a warm mode in operation 308. If an actual heater core temperature is greater than a heater core temperature request plus a predetermined hysteresis, the heater core operates in a hot mode in operation 310. The controller will continue to monitor the relationship between actual heater core temperature and heater core temperature requests and direct appropriate transition between operation 306, operation 308, and operation 310. The resulting state, e.g. cold, warm, or hot, is used in a control strategy to command the desired system mode as further described below and shown in FIG. 5. The desired system mode is used to determine commands for various actuators or valves of the system.

Figure 5:
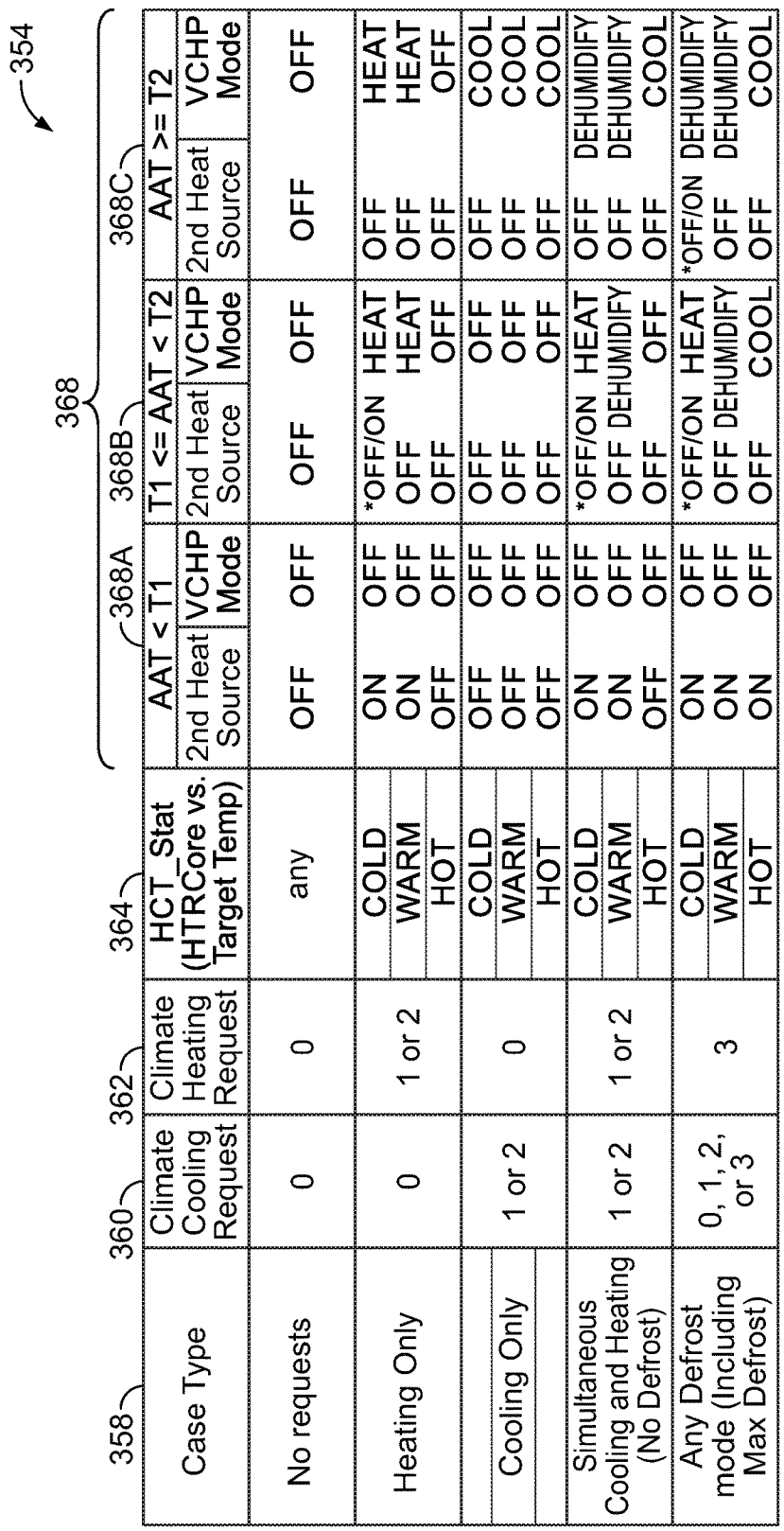
FIG. 5 is a table illustrating an example of a heat pump mode control strategy of a VCHP subsystem including one of a fixed orifice expansion device, a thermal expansion valve, and an electronic expansion valve.

FIG. 5 shows an example of a table for use with a control strategy for the VCHP subsystem including an expansion device referred to generally as a table 354. In one example, the table 354 may be accessible via a controller directing operation of the VCHP subsystem. Commands included in the table 354 assist in directing operations of a heat pump mode and a secondary heat source to identify efficient operation based on hardware and environmental conditions. In this example, T1 and T2 may be calibratable constants. For example, T1 may be approximately negative ten degrees Celsius and T2 may be approximately zero degrees Celsius. Table 354 includes a case type column 358, a climate cooling request column 360, a climate heating request column 362, a hct_stat column 364, and a group of columns 368 indicating various VCHP mode commands. The group of columns 368 is divided into three columns based on thermal conditions. Column 368A includes commands for scenarios in which ambient temperature (AAT) is less than T1. Column 368B includes commands for scenarios in which T1 is less than or equal to AAT and AAT is less than T2. Column 368C includes commands for scenarios in which AAT is greater than or equal to T2. A '*' is included to indicate a condition in which a secondary heat source may be run to achieve desired thermal conditions based on whether a heat pump can keep up with an amount of heat demanded.

In the climate cooling request column 360 of the table 354, '0' denotes a no cooling request, '1' denotes an opportunistic cooling request, '2' denotes a fast temperature pull down cool request, and '3' denotes a defrost/defog request. The case type column 358 may represent a request from another system, user manual input, or an auto mode. In the climate heating request column 362 of the table 354, '0' denotes a no heating request, '1' denotes an opportunistic heating request, '2' denotes a fast temperature heat up request, and '3' denotes a defrost/defog request.

The hct_stat column 364 represents results from a state machine, such as the control strategy 300, and describing the heater core coolant temperature relationship to the target heater core coolant temperature. For example, when the heater core coolant temperature is measured to be less than the target heater core coolant temperature, the hct_stat column 364 indicates COLD. When the heater core coolant temperature is measured to be greater than the target heater core coolant temperature but less than the target heater core coolant temperature plus a first hysteresis then the hct_stat column 364 indicates WARM. When the heater core coolant temperature is measured to be greater than the target heater core coolant temperature plus a second hysteresis then the hct_stat column 364 indicates HOT.

The VCHP mode, represented by the VCHP mode columns 368A, 368B, and 368C, may be selected based on referencing the table 354. The table 354 may assist in determining the most efficient heat pump operating mode to achieve desired vehicle operating conditions to allow, for example, the vehicle to operate in a lower energy state. If cooling and heating are requested simultaneously, a priority of cooling or heating will be determined based on environmental conditions to improve efficiency of the heat pump subsystem 32 and also to improve electric range. Under certain conditions, the secondary heat source 49 or the power source 12 may operate instead of a heat pump to provide supplemental heat to the system.

In another example, if an ambient temperature is measured as being below a predetermined threshold, it may be more efficient to operate the heat pump in heating mode until the hct_stat is WARM and then provide vehicle dehumidification by operating the heat pump in cooling mode and using a secondary heat source, such as a PTC heater, to heat the coolant. Operating in this fashion may also accelerate an amount of time required to comfort a vehicle passenger. In yet another example, if the ambient temperature is measured as being above the predetermined threshold, the heat pump would be directed to operate in cooling mode and use the secondary heat source to heat the coolant.

Figure 6:
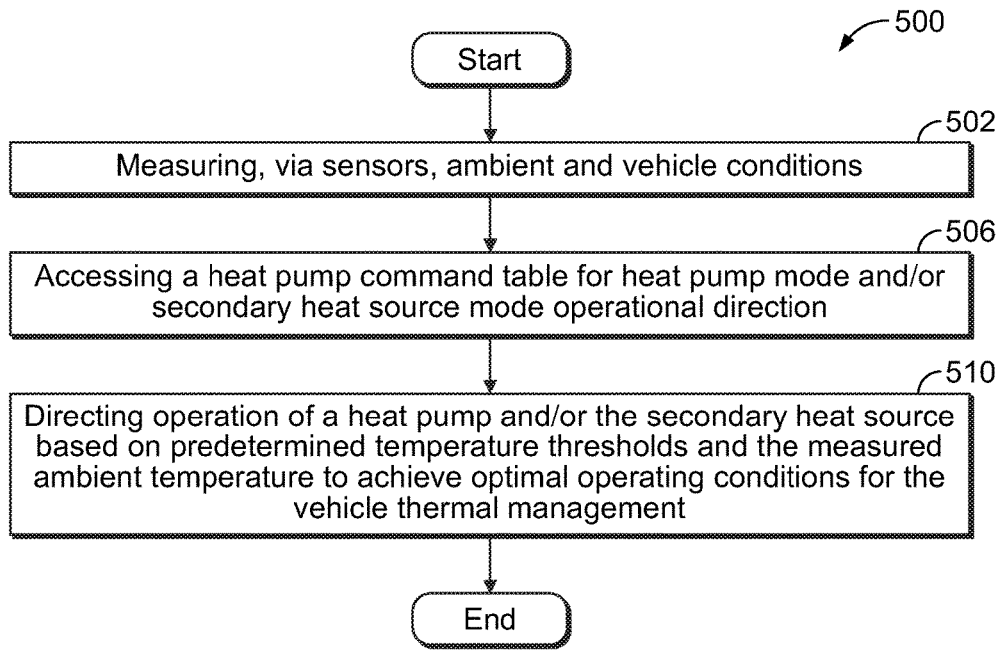
FIG. 6 is a flow chart illustrating an example of an algorithm for operation of a VCHP subsystem.

FIG. 6 shows an example of an algorithm for operation of a VCHP subsystem. The algorithm is generally indicated by reference numeral 500. In operation 502, one or more sensors may measure ambient temperature and a controller may monitor vehicle conditions, such as thermal conditions, via vehicle sensors. The one or more sensors may send a signal including information relating to the measured conditions to the controller. Examples of vehicle conditions include heater core coolant actual temperature, target heater core coolant temperature, occurrence of a climate control heat request, and occurrence of a climate control cool request. In operation 506, the controller may access a table including operational direction for a heat pump and a secondary heat source such as table 354. As described above, examples of the secondary heat source include a PTC heater and an engine. In operation 510, the controller may direct operation of the heat pump and/or the secondary heat source based on the table to influence an efficiency of vehicle thermal management.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle climate control system for an electrified vehicle comprising:
   a thermal circuit including a combustion engine, a vapor compression heat pump (VCHP) operative in a cool mode and a heat mode, and a positive temperature coefficient (PTC) heater; and
   a controller programmed to direct operation of the combustion engine, VCHP and the PTC heater based on a heat source mode table in which a cooling and heating priority is identified based on detected environmental conditions to increase vehicle electric range and detection of a system configuration in which cooling is provided by—
   the VCHP in a first cooling mode,
   the VCHP and heat is provided by the PTC in a second cooling mode, and heating is provided by—
   the combustion engine in a first mode,
   the combustion engine and the PTC heater in a second mode,
   the VCHP in a third mode, and
   the VCHP and PTC in a fourth mode.

2. The system of claim 1, wherein the heat source mode table calls for the VCHP to operate in a cool mode and the PTC heater to operate in a heat mode when heater core coolant is identified as warm and ambient temperature is above a predetermined threshold.

3. The system of claim 1, wherein the heat source mode table calls for the VCHP to operate in a cool mode and the PTC heater to be inactive when heater core coolant is identified as hot and ambient temperature is above a predetermined threshold.

4. The system of claim 1, wherein the heat source mode table calls for the PTC heater to output heat when heater core coolant is identified as warm and ambient temperature is less than or equal to a predetermined threshold.

5. The system of claim 1, wherein the simultaneous cooling and heating operation is further based on a climate heating request, a climate cooling request, ambient temperature, and a relationship between heater core coolant temperature and a target heater core coolant temperature.

6. The system of claim 1, wherein heater core coolant temperature is measured by a sensor and input into the heat source mode table as one of cold, warm, and hot based on calibratable constants.

7. The system of claim 1, wherein the expansion device is one of a fixed orifice expansion device (FOT), a thermal expansion valve (TXV), and an electronic expansion valve (EXV), and wherein an operating status of the FOT, TXV, or EXV is active during a cooling mode.

8. The system of claim 1, wherein the expansion device is one of a fixed orifice expansion device (FOT), a thermal expansion valve (TXV), and an electronic expansion valve (EXV), and wherein an operating status of the FOT, TXV, or EXV is not active during a heating mode.

9. The system of claim 1, wherein the expansion device is one of a fixed orifice expansion device (FOT), a thermal expansion valve (TXV), and an electronic expansion valve (EXV), and wherein the system further comprises another one of a FOT, TXV, or EXV, wherein during a dehumidification mode an operating status of the FOT, TXV, or EXV is active for a cooling expansion device and an operating status of the another one of the FOT, TXV, or EXV is active for a heating expansion device.

10. The system of claim 1, wherein operation of the VCHP is operated in a dehumidify mode and the PTC heater is inactive when a temperature of the heater core coolant is warm and an ambient temperature is above a predetermined threshold.

11. A vehicle climate control system for an electrified vehicle comprising:
    a thermal circuit including a vapor compression heat pump (VCHP) operative in a cool mode and a heat mode, a secondary heat source, and an expansion device; and
    a controller programmed to activate the secondary heat source based on an operating status of the expansion device and a mode command table in which a cooling and heating priority is identified based on detected environmental conditions to increase vehicle electric range, wherein the secondary heat source is a positive temperature coefficient heater, and wherein the mode command table calls for the VCHP to operate in a dehumidify mode and the positive temperature coefficient heater to be inactive when a temperature of heater core coolant is identified as warm and ambient temperature is above a predetermined threshold.

12. The system of claim 11, wherein the expansion device is one of a fixed orifice expansion device (FOT), a thermal expansion valve (TXV), and an electronic expansion valve (EXV), and wherein when the secondary heat source is activated and the FOT, TXV, or EXV is directed to operate as active during a heating mode.

13. A vehicle climate control system for an electrified vehicle comprising:
    a thermal circuit including a vapor compression heat pump (VCHP) operative in a cool mode and a heat mode, a secondary heat source, and an expansion device; and
    a controller programmed to activate the secondary heat source based on an operating status of the expansion device and a mode command table in which a cooling and heating priority is identified based on detected environmental conditions to increase vehicle electric range, wherein the secondary heat source is a positive temperature coefficient heater, and wherein the mode command table calls for the VCHP to operate in a dehumidify mode and the positive temperature coefficient heater to be inactive when heater core coolant is identified as cold and ambient temperature is above a predetermined threshold.

14. A method to operate a vehicle climate control system comprising:
    responsive to receiving a cool mode request and a heat mode request simultaneously, outputting via a controller a command to activate a secondary heat source based on ambient temperature and a predetermined calibratable constant temperature such that the secondary heat source operates with a vapor compression heat pump (VCHP) is operative in one of a cool mode to cool the vehicle, and a heat mode to replace an amount of heat rejected by an internal combustion engine in communication with the system.

15. The method of claim 14 further comprising, responsive to detection of a flow change for one of a fixed orifice expansion device, a thermal expansion valve, and an electronic expansion valve, outputting via the controller a heat pump operating command to adjust a climate of a vehicle based on the ambient temperature, a heater core coolant temperature, a target heater core coolant temperature, and a climate control request.

16. The method of claim 14, wherein the secondary heat source is one of a positive temperature coefficient heater and an engine.

17. The method of claim 14 wherein the VCHP is operative in the cooling mode when a request for cooling or dehumidification is received by the controller, and wherein the VCHP is operative in the heating mode when a request for heating is received by the controller and when a heater core temperature is below a predetermined temperature.

18. The method of claim 14 wherein the VCHP is operative in the heating mode or a dehumidification mode when a request for simultaneous cooling and heating is received by the controller and when a heater core temperature is below a predetermined temperature.

\* \* \* \* \*